(12) United States Patent
Seyrlehner et al.

(10) Patent No.: US 10,139,072 B2
(45) Date of Patent: Nov. 27, 2018

(54) LIGHTING UNIT FOR A VEHICLE HEADLAMP

(71) Applicant: ZIZALA LICHTSYSTEME GMBH, Wieselburg (AT)

(72) Inventors: Christian Seyrlehner, Ybbsitz (AT); Andreas Bauer, Wieselburg (AT); Bernd Eichinger, Wieselburg (AT)

(73) Assignee: ZKW Group GmbH, Wieselburg (AT)

( * ) Notice: Subject to any disclaimer, the term of this patent is extended or adjusted under 35 U.S.C. 154(b) by 140 days.

(21) Appl. No.: 14/783,886

(22) PCT Filed: Apr. 9, 2014

(86) PCT No.: PCT/AT2014/050087
§ 371 (c)(1),
(2) Date: Oct. 12, 2015

(87) PCT Pub. No.: WO2014/165890
PCT Pub. Date: Oct. 16, 2014

(65) Prior Publication Data
US 2016/0061401 A1 Mar. 3, 2016

(30) Foreign Application Priority Data

Apr. 12, 2013 (AT) .............................. A50254/2013

(51) Int. Cl.
*B60Q 1/00* (2006.01)
*B60Q 1/04* (2006.01)
(Continued)

(52) U.S. Cl.
CPC .......... *F21S 41/663* (2018.01); *B60Q 1/0041* (2013.01); *B60Q 1/0058* (2013.01);
(Continued)

(58) Field of Classification Search
CPC ..... F21S 48/1747; F21S 48/115; F21S 48/215
See application file for complete search history.

(56) References Cited

U.S. PATENT DOCUMENTS 6,097,549 A * 8/2000 Jenkins .................. B60Q 1/302
359/726
6,527,411 B1 * 3/2003 Sayers ................ F21S 48/1154
362/237
(Continued)

FOREIGN PATENT DOCUMENTS

DE          10303430 A1    8/2003
DE      102005043992 A1    5/2007
(Continued)

OTHER PUBLICATIONS

English translation of (DE102005043992).*
(Continued)

*Primary Examiner* — Jong-Suk (James) Lee
*Assistant Examiner* — Eric T Eide
(74) *Attorney, Agent, or Firm* — Eversheds Sutherland (US) LLP

(57) ABSTRACT

The invention relates to a lighting unit (1) for a headlight (100), in particular for a headlight for a motor vehicle, wherein the lighting unit at least comprises:
*) a first light source group (10), which first light source group (10) comprises at least one light source (11, 12, 13, 14),
*) a the second light source group (20), which second light source group (20) comprises at least one light source (21), wherein the first light source group (10) is configured to generate a first light function, and wherein the second light source group (20) is configured to generate a second light function, which is different from the first light function, and wherein each light source (11, 12, 13, 14) of the first light source group (10) couples light into an optics element (111,
(Continued)

112, 113, 114) associated with the respective light source (11, 12, 13, 14), and wherein each light source (21) of the second light source group (20) couples light into an optics element (121) associated with the respective light source (21), and wherein a secondary optics, in particular in the form of a diffusing optics (50), is arranged downstream of the optics elements (111, 112, 113, 114, 121), through which secondary optics (50) the light exiting from all optics elements (111, 112, 113, 114, 121) passes and is irradiated into a region in front of the lighting unit (1), and wherein the least two groups (10, 20) of light sources (11, 12, 13, 14, 21) can be controlled separately.

23 Claims, 5 Drawing Sheets

(51) Int. Cl.
| | |
|---|---|
| F21S 8/10 | (2006.01) |
| F21S 41/663 | (2018.01) |
| B60Q 1/26 | (2006.01) |
| F21S 41/141 | (2018.01) |
| F21S 43/14 | (2018.01) |
| F21S 43/241 | (2018.01) |
| F21S 43/31 | (2018.01) |

(52) U.S. Cl.
 CPC .............. *B60Q 1/04* (2013.01); *B60Q 1/2607* (2013.01); *F21S 41/141* (2018.01); *F21S 43/14* (2018.01); *F21S 43/241* (2018.01); *F21S 43/315* (2018.01); *B60Q 2400/30* (2013.01)

(56) References Cited

U.S. PATENT DOCUMENTS

| | | | |
|---|---|---|---|
| 2003/0147252 A1* | 8/2003 | Fioravanti | ................ B60Q 1/04 362/543 |
| 2008/0055896 A1* | 3/2008 | Feldmeier | .......... H05B 33/0872 362/231 |
| 2012/0081915 A1* | 4/2012 | Foote | ........................ B60R 1/12 362/494 |
| 2014/0316742 A1* | 10/2014 | Sun | .................... G02B 19/0066 702/167 |

FOREIGN PATENT DOCUMENTS

| | | |
|---|---|---|
| DE | 102009022848 A1 | 12/2010 |
| DE | 102010056313 A1 | 6/2012 |
| DE | 102011103179 A1 | 12/2012 |
| EP | 2012056 A1 | 1/2009 |
| EP | 2306075 A2 | 4/2011 |
| WO | 2011154470 A1 | 12/2011 |
| WO | 2013020155 A1 | 2/2012 |

OTHER PUBLICATIONS

First Office Action dated Feb. 13, 2014 of Austrian Patent Application No. A 50254/2013.
International Search Report dated Jul. 11, 2014 for PCT/AT2014/050087.
International Preliminary Report on Patentability dated Jul. 8, 2015 for PCT/AT2014/050087.

* cited by examiner

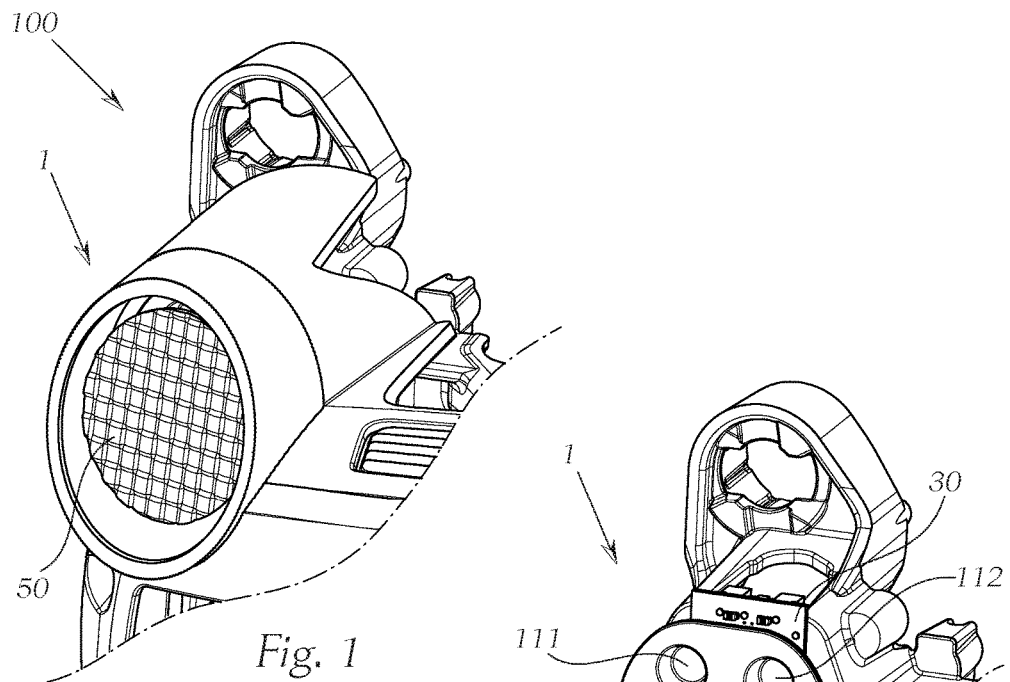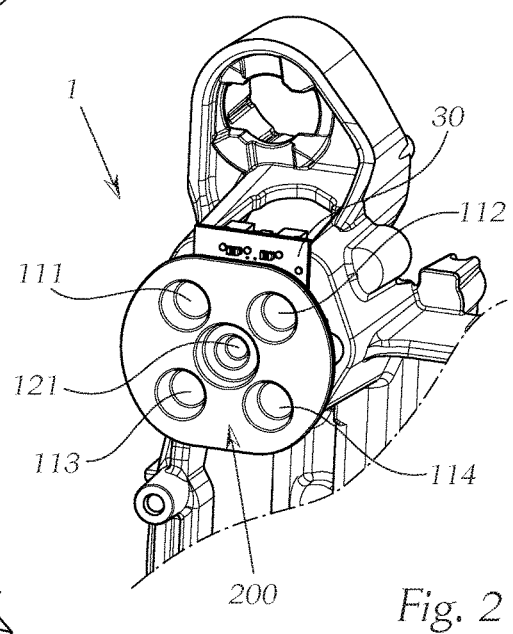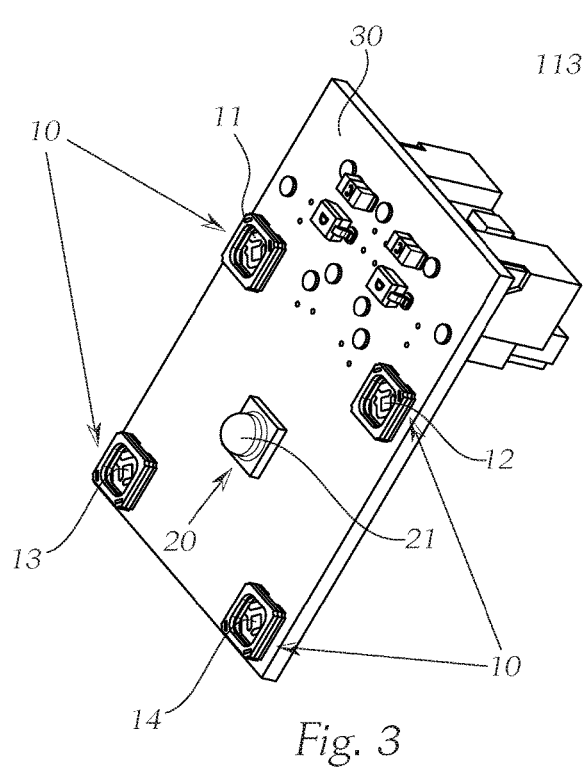

LIGHTING UNIT FOR A VEHICLE HEADLAMP

The invention relates to a lighting unit for a headlight, in particular for a headlight for a motor vehicle.

The invention also relates to a headlight for a vehicle comprising at least one such lighting unit.

In headlight technology it is often desirable to provide two or more light functions using just one or more identical illuminating devices/lighting units. By way of example, a flashing light function and the position light function or daytime running light function are often provided by means of one or more lighting units, wherein one lighting unit provides both light functions. The light of both light functions exits here via a common light exit area.

Such a light exit area here is of a certain size and it is then often problematic to provide a homogeneously lighting light exit area. Such homogeneously lighting areas, however, are often desirable on account of the improved visual impression, and are also prescribed by law.

One object of the invention is to create a compact lighting unit for producing two or more light functions, with which the above-mentioned problems are overcome.

In addition, a further object of the invention is to create a lighting unit that meets the requirements of a homogeneous appearance of the individual light functions.

This object is achieved with a lighting unit of the type mentioned in the introduction in that, in accordance with the invention, the lighting unit at least comprises:

*) a first light source group, which first light source group comprises at least one light source,

*) a second light source group, which second light source group comprises at least one light source, wherein the first light source group is configured to generate a first light function, and wherein the second light source group is configured to generate a second light function, which is different from the first light function, and wherein each light source of the first light source group couples light into an optics element associated with the respective light source, and wherein each light source of the second light source group couples light into an optics element associated with the respective light source, and wherein a secondary optics, preferably in the form of a diffusing optics, is arranged downstream of the optics elements, through which secondary optics the light exiting from the optics elements passes and is irradiated into a region in front of the lighting unit, and wherein the least two groups of light sources can be controlled separately.

The light sources of both light functions irradiate light through a common diffusing optics (secondary optics), for example a diffusing plate, and therefore an area with defined form is illuminated in the case of both light functions. By way of example, such an area, i.e. the diffusing optics, has a circular form in a view from the front. Such a defined area, in particular a circular area, may be lit up or illuminated/lit through easily in a homogeneous manner. Due to the use of a primary optics in the form of an optics element for each light source, the diffusing optics can also be lit up optimally for each light function.

It is important primarily that the individual groups of light sources can be controlled independently of one another, such that the individual light functions can be activated and deactivated independently of one another or can be operated alternately to one another (for example in the case of a flashing light-daytime running light).

In some circumstances it may also be advantageous if the individual light sources within a group can be controlled separately from one another.

In particular it is advantageous if the optics elements are formed as TIR lenses.

TIR lenses (TIR=total internal reflection) are lenses with total reflection. This lens type is characterised by a particularly high bundling efficiency with shallow installation depth.

TIR lenses of this type have two regions, specifically a refractive part (generally the centre of the lens), in which the light is bundled by refraction, and an outer reflective part, in which the light is bundled by mirroring or by total reflection.

In particular the optics elements associated with the light sources are formed as light-collecting optics.

It is particularly advantageous if the optics elements associated with the light sources are formed in a common optical component (also referred to as a collection optics).

This optical component accordingly has a number of totally reflective, light-collecting regions corresponding to the number of optics. Due to the integration of all optics elements, in particular all TIR lenses, in one component, the advantage is provided that there is no need for a number of optics elements when assembling and positioning the lighting units, but merely a single component has to be positioned and secured.

Furthermore, the at least one light source of the first light source group and at least one light source of the second light source group are advantageously arranged on a common support.

This support is preferably a circuit board, which in turn is preferably arranged on a heat sink.

In a specific embodiment of the invention it is favourable to arrange the at least one light source of the first light source group and the at least one light source on a flat area of the common support.

It may then be advantageous for all light sources to be arranged in a substantially identically directed manner, such that these irradiate light reliably in an optimal manner through the common diffusing plate.

In accordance with a specific embodiment the first light source group is configured to generate a flashing light function.

Furthermore, in accordance with the specific embodiment, the second light source group is configured to generate a daytime running light function, a position light function, or a combined daytime running light-position light function (here, position light is a dipped daytime running light).

Furthermore, in a specific embodiment, in particular in conjunction with the generation of a flashing light function, the first light source group comprises two or more light sources.

By way of example it has proven to be advantageous when the first light source group comprises exactly four light sources.

Furthermore, in a specific embodiment, in particular in conjunction with the generation of a position light and/or daytime running light, it is advantageous if the second light source group comprises exactly one light source.

In order to achieve an optimal illumination of the diffusing plate or diffusing optics, it is advantageous if the light sources of the first light source group are arranged around the at least one, preferably exactly one, light source of the second light source group.

In this sense it is also advantageous when the least one, preferably exactly one light source of the second light source group is/are arranged in the centre of the two or more light sources of the first light source group.

In accordance with a specific embodiment, in order to achieve a uniform illumination of the diffusing optics, the four light sources are arranged at the corners of a virtual rectangle or square.

The at least one, preferably exactly one, light source of the second light source group is in this case preferably arranged at the point of intersection of the diagonals of the rectangle or square.

In addition, it is particularly advantageous when the one or more optics elements of the first group, in terms of its/their horizontal and/or vertical, in particular in terms of its/their horizontal and vertical irradiation behaviour in the centre of the optics element, is/are formed as wide emitters.

It is also advantageous when the one or more optics elements of the first group, in terms of its/their horizontal and/or vertical, in particular in view of its/their horizontal and vertical irradiation behaviour in the region of a casing of the optics element, is/are formed as a combined wide and criss-cross emitter.

Furthermore, it is also advantageous when the two or more optics elements of the first group are identical in terms of their irradiation behaviour.

There are inhomogeneities in the light distribution on account of the system, due to the arrangement of generally two or more, in particular 4, light sources and optics elements of the first group in a grid. Here, it has been found that, by mixing between criss-cross and wide emitter principles, a good uniformity in the light distribution, i.e. merely small brightness fluctuations over the light exit area of the secondary optics (diffusing optics), is achieved at the lens casing, and the "spot" behaviour of the light sources, in particular in the form of light-emitting diodes, can be damped as a result.

Furthermore, but one or more optics elements of the second group, in terms of its/their horizontal irradiation behaviour in the region of a casing of the optics element, is/are formed as criss-cross emitters.

Furthermore, the one or more optics elements of the second group, in terms of its/their horizontal irradiation behaviour in the centre of the optics element, is/are formed as wide emitters.

Lastly, it is also advantageous if the one or more optics elements of the second group, in terms of its/their vertical irradiation behaviour, irradiates/irradiate light beams substantially in parallel.

The light source, generally the exactly one light source, of the second group preferably lies in the centre of the light sources of the first group, and the light of the first group is to be irradiated as efficiently as possible. Here, the homogeneity of the irradiated light has a subordinate role and in this respect is less important than the fact that, in the case of the central arrangement of just one diffusing optics per lens tube (secondary optics), the light density should decrease outwardly uniformly and no inhomogeneities should be possible.

In a particularly advantageous embodiment of the invention the light sources are LED light sources, wherein each LED light source comprises at least one light-emitting diode.

Here, it may be possible that each LED light source can be controlled and can be switched on and off and/or can be dimmed separately, wherein each light-emitting diode of an LED light source preferably can be controlled and can be switched on and off and/or can be dimmed separately.

Individual optics elements in the collection optics are advantageously distanced from one another in such a way that no transition regions for light exist between the optics elements, and there is thus no mixing of light from different optics elements.

For design reasons, however, adjacent optics elements may also transition into one another in transition regions. In this way the optical component emits light not only into the light exit regions associated with the individual optics elements, but also into the regions between the optics elements.

The object stated in the introduction is also achieved with a vehicle headlight comprising one or more lighting units as described above.

In a specific embodiment the vehicle headlight comprises four such lighting units.

Four lighting units are preferably arranged at the four corners of a virtual rectangle or square.

It is also advantageous if all lighting units are of substantially identical structure.

The invention will be explained in greater detail hereinafter with reference to the drawings, in which FIG. 1 shows a detail of a vehicle headlight in the region of a lighting unit according to the invention, FIG. 2 shows the lighting unit from FIG. 1 with removed secondary optics, FIG. 3 shows a light source arrangement of a lighting unit according to the invention, FIG. 4 shows the light source arrangement from FIG. 3 with primary optics arranged to the front in a partially transparent illustration, FIG. 5 shows a horizontal section through an optics element of a first light source group for illustration of the beam profile in the edge region, FIG. 6 shows a horizontal section through an optics element of a first light source group for illustration of the beam profile in the centre of the optics element, FIG. 7 shows a vertical section through an optics element of a first light source group for illustration of the beam profile in the edge region, FIG. 8 shows a vertical section through an optics element of a first light source group for illustration of the beam profile in the centre of the optics element, FIG. 9 shows a horizontal section through an optics element of a second light source group for illustration of the beam profile in the edge region, FIG. 10 shows a horizontal section through an optics element of a second light source group for illustration of the beam profile in the centre of the optics element, FIG. 11 shows a vertical section of an optics element of a second light source group for illustration of the beam profile in a vertical direction, FIG. 12 shows the front side of the optical component, FIG. 13 shows a section along the line A-A in FIG. 12, FIG. 14 shows a section along the line B-B in FIG. 12, and FIG. 15 shows a rear view of the optics element from FIG. 12.

FIG. 16 shows a front view of four lighting units arranged at the corners of a virtual rectangle or square.

FIG. 1 shows a lighting unit 1 of a vehicle headlight 100. Here, FIG. 1 shows merely a detail of the vehicle headlight 100, and in a specific example the vehicle headlight 100 has four lighting units 1, which are arranged at the corners of a virtual rectangle or square.

A lighting unit 1 has, as shown in FIG. 1, a diffusing plate 50, through which the light sources located therebehind irradiate light, as described hereinafter. All lighting units 1 preferably have a substantially identical structure FIG. 2 shows the lighting unit 1 from FIG. 1, now with removed diffusing plate, such that an optical component 200 is now visible. A number of primary optics (optics elements) 111, 112, 113, 114, 121 are arranged in this optical component 200 or are formed in the component 200.

As can be seen from FIGS. 3 and 4 in combination with FIG. 2, the lighting unit 1 comprises a first light source group 10, which group 10 comprises four light sources 11, 12, 13, 14, and a second light source group 20, which comprises exactly one light source 21.

The light sources 11, 12, 13, 14, 21 each consist of at least one light-emitting diode (LED), generally from exactly one LED.

The four light sources 11, 12, 13, 14 of the first group 10 are arranged at the corners of a virtual square.

The light source 21 of the second light source group 20 is located in the centre of the four light sources in 11, 12, 13, 14.

All light sources 11, 12, 13, 14, 21 are mounted on a common support 30, for example are mounted on a heat sink, more specifically preferably on a flat area of the common support 30, such that all light sources irradiate light substantially in an identically directed manner through the associated diffusing optics 15. Specifically, all light sources here are arranged on a common printed circuit board/circuit board 30 (support), which is in turn mounted for example on a heat sink.

The two groups 10, 20 can be controlled separately, such that two light functions—a first light function for example in the form of a flashing light/direction indicator by means of the light sources of the first groups and a second light function, for example a daytime running light or a position light with the light source of the second group 20—can be switched on and off independently of one another, wherein this is the case preferably in flashing light operation, in which the flashing light and the daytime running lights are switched on and off alternately.

Each light source 11, 12, 13, 14 of the first light source group 10 couples light into an optics element 111, 112, 113, 114 associated with the respective light source 11, 12, 13, 14 (see FIGS. 2 and 4).

The light source 21 of the second light source group 20 also couples light into its own associated optics element 121.

These optics elements 111, 112, 113, 114, 121 emit the light onto the common diffusing optics 50; in the event of activation of the group 1, the light sources 11, 12, 13, 14 here emit light onto the diffusing optics 50 via the optics elements 111, 112, 113, 114, and in the event of actuation of the group 2, the light source 21 emits light onto the diffusing optics 50 via the optics element 121.

The optics elements 111, 112, 113, 114, 121 are light-collecting optics, which are formed as TIR lenses. TIR lenses (TIR=total internal election) are lenses with total reflection. This lens type is characterised by a particularly high bundling efficiency with shallow installation depth.

TIR lenses of this type have two regions, specifically a refractive part (generally the centre of the lens), in which the light is bundled by refraction, and an outer reflective part, in which the light is bundled by mirroring or by total reflection. The individual optics elements will be discussed in greater detail further below.

The specified five optics elements 111, 112, 113, 114, 121 are formed in a common optical component 200. This optical component 200 accordingly has a number of totally reflective, light-collecting regions corresponding to the number of optics elements. Due to the integration of all optics elements, in particular all TIR lenses, in one component, the advantage is provided that there is no need for a number of optics elements when assembling and positioning the lighting units, but merely a single component has to be positioned and secured.

FIG. 5 and FIG. 6 each show a horizontal section through an idealised TIR optics element 111, which is associated with a light source 11 of the first group 10. Here, FIG. 5 shows the beam profile in the edge or casing region of the TIR lens 111, whereas FIG. 6 shows the beam profile in a region of the centre of the TIR lens 111. The total beam profile is given naturally from the superimposition of these illustrations, but for reasons of improved clarity is not illustrated in the drawings.

As can be clearly seen, the TIR optics element 111 in the region of its casing 111' is formed as a combined wide and criss-cross emitter, whereas it is formed in its centre 111" as a wide emitter.

Here, the term "criss-cross emitter" means that light beams from a lens formed as a criss-cross emitter or from a lens region formed as a criss-cross emitter are refracted towards the optical axis X of the lens, i.e. cross said axis.

Here, the term "wide emitter" means that light beams from a lens region formed as a wide emitter or from a lens region formed as a wide emitter are refracted away from the optical axis X of the lens, i.e. do not cross said axis.

The inner casing region 111' adjoining the refractive region 111" in FIG. 5 is formed as a wide emitter, whereas the lens in an outer casing region 111' is formed as a criss-cross emitter, and the casing region 111' is therefore formed as a combined wide and criss-cross emitter.

In the vertical direction the radiation behaviour of the TIR lens 111 is similar, as can be inferred from the vertical section through the lens 111 illustrated in FIGS. 7 and 8.

The optical elements 111, 112, 113, 114 of the first group 10 are formed identically in terms of their irradiation behaviour.

FIG. 9 and FIG. 10 each show a horizontal section through an idealised TIR optics element 121, which is associated with the light source 21 of the second group 20. Here, FIG. 9 shows the beam profile in the edge region of the TIR lens 121, whereas FIG. 10 shows the beam profile in the region of the centre of the TIR lens 121. The total beam profile is given naturally from the superimposition of these illustrations, but for reasons of improved clarity is not illustrated in the drawings.

In the region of the casing 121' of the TIR lens, said lens is formed as a criss-cross emitter, whereas it is formed in its centre 121" as a wide emitter.

FIG. 11 lastly also shows a vertical section through the TIR lens 121. As can be inferred from FIG. 11, the TIR lens 121 has a substantially parallel irradiation behaviour in terms of the vertical direction of light beams.

Figure 13:
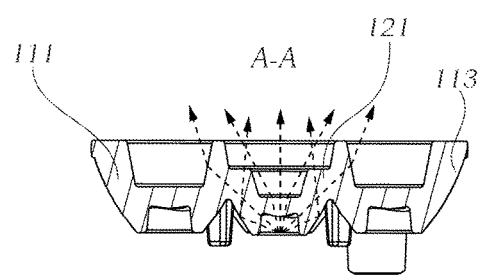
FIG. 13 shows a section along the line A-A in FIG. 12.
Figure 14:
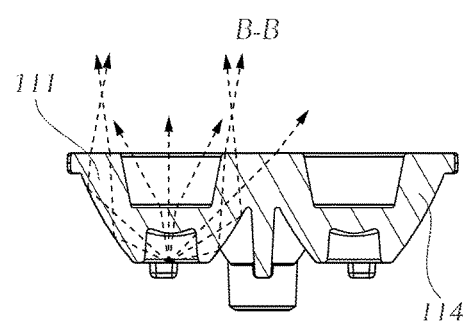
FIG. 14 shows a section along the line B-B in FIG. 12.

As can be clearly seen from the sections in FIGS. 13 and 14, apart from the fact that the individual TIR lenses have an indentation in their centre and their light exit areas therefore do not lie in a single plane, the individual TIR lenses in the shown illustration are not formed as individual lenses separate from one another, but together form the one-piece optical compovent 200 (collection optics 200).

In the shown embodiment the individual TIR lenses additionally transition in their edge regions into the adjacent TIR lenses. When permitted by the boundary conditions, for example the design, it may also be, however, contrary to the illustration, that the individual TIR lenses advantageously do not transition into one another.

In the shown embodiment, in which the TIR lenses transition into one another, the casing of the "respective" TIR lens loses its totally reflective properties in these transition regions, for example in the transition regions between the TIR lenses 111-121 and 121-113 in FIG. 13 or the TIR lenses 111-114 in FIG. 14 (this is of course also true for all other transition regions not shown), and therefore the light from one TIR lens enters an adjacent TIR lens and exits from the light exit area of the adjacent TIR lens.

Figure 15:
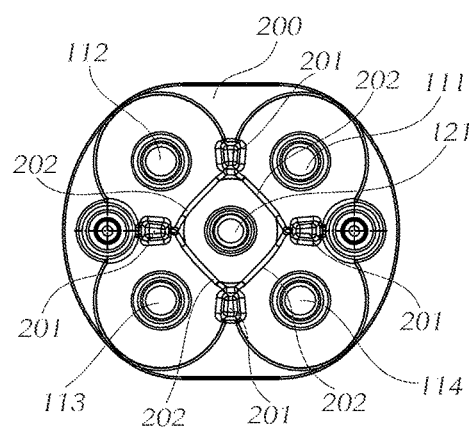

FIG. 15 also shows the optical component 200 in a rear view with schematically indicated transition regions 201 in each case between the individual TIR lenses 111-112, 111-114, 112-113 and 113-114 and transition regions 202 between the central TIR lens 121 and the four outer TIR lenses 111, 112, 113, 114.

Figure 4:
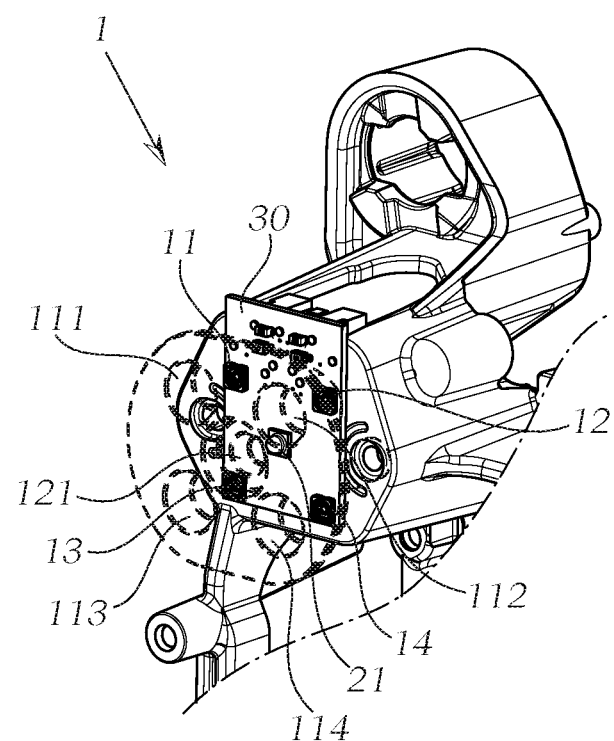
Figure 5:
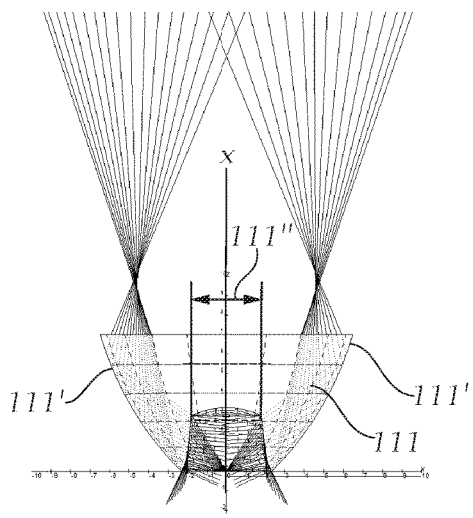
FIGS. 5-11 show the irradiation behaviour of the TIR lenses in an idealised illustration, i.e. in isolation, without the adjacent lenses in the optical component 200.
Figure 6:
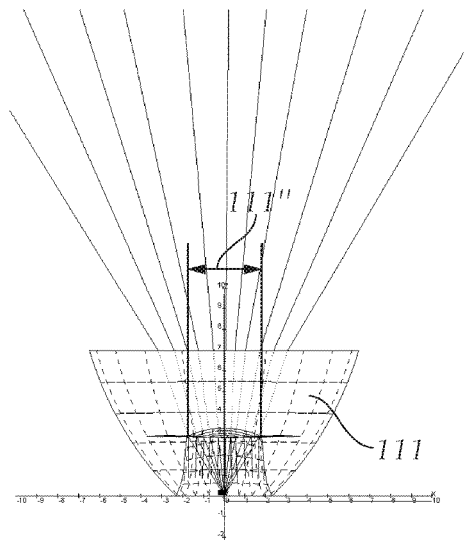
Figure 7:
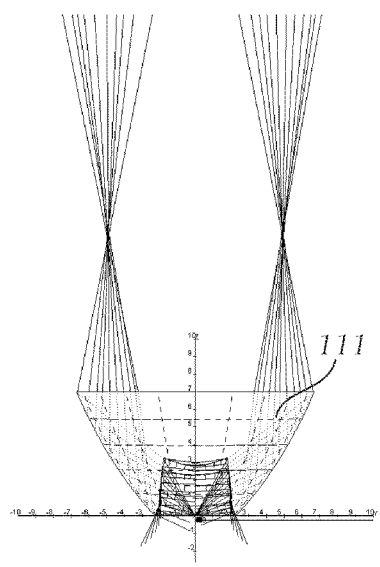
Figure 8:
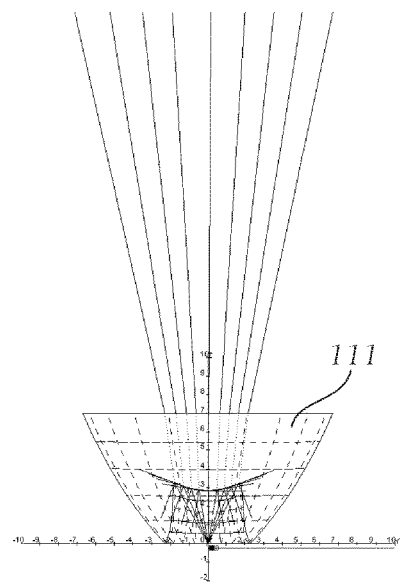
Figures 9, 10:
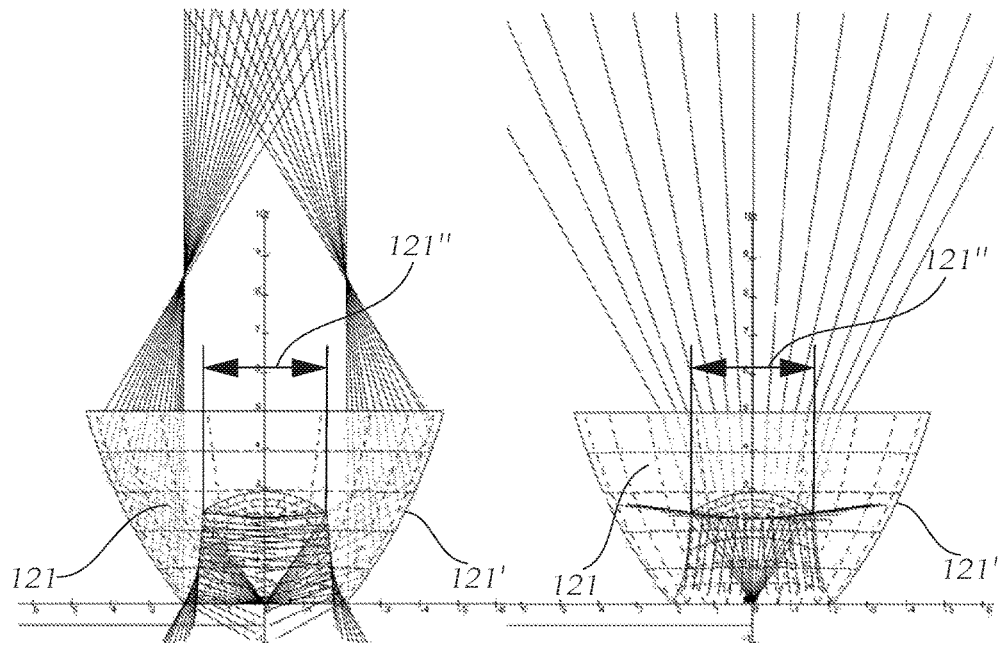
Figure 11:
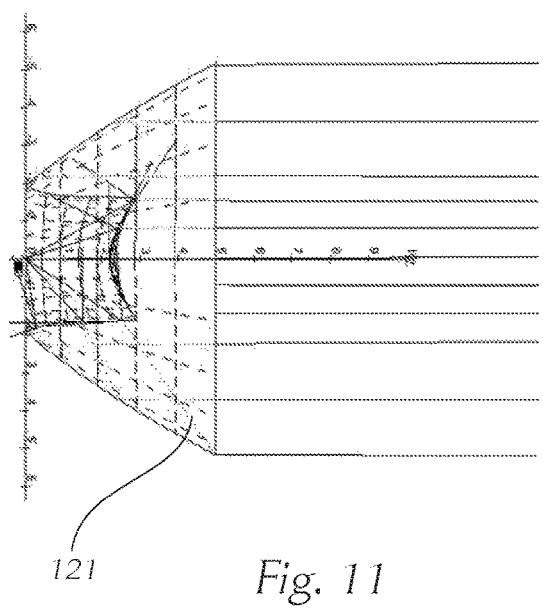
Figure 12:
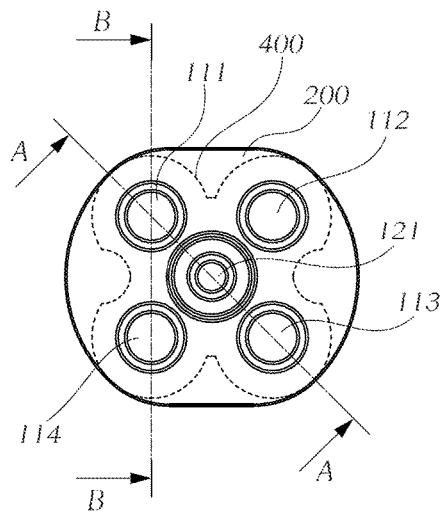
FIG. 12 shows the front side, i.e. the light exit side of the optical component 200 with the TIR lenses 111, 112, 113, 114, 121.

With reference again to FIG. 12, the region 400 of the component 200 schematically shows the region that approximately is illuminated when the indicator is actuated, wherein the region of the TIR lens 121, i.e. the region of the (switched-off) daytime running light, is also illuminated, but more weakly than the surrounding region, since here less light exits from the TIR lenses 111, 112, 113, 114. However, the light is diffused anyway by the diffusing optics 50, such that these differences are not perceived visually.

The outermost regions of the component 200 outside the region 400 are in practice not lit or are only slightly lit, however this is negligible.

When the indicator is switched off and only the daytime running light is illuminated, the central region 121 will be lit up, however light may also exit to a small extent from the indicator lenses (TIR lenses 111, 112, 113, 114).

Figure 16:
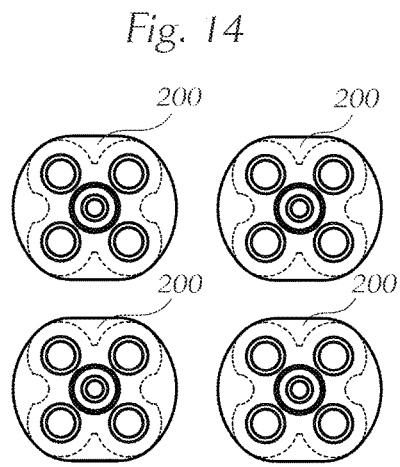

FIG. 16 shows four optical components 200 arranged at the corners of a virtual rectangle or square.

The invention claimed is:

1. A lighting unit (1) for a headlight (100) for a motor vehicle, wherein the lighting unit comprises:
a first light source group (10) comprising at least one light source (11, 12, 13, 14),
a second light source group (20) comprising at least one light source (21),
wherein the first light source group (10) is configured to generate a first light function,
wherein the second light source group (20) is configured to generate a second light function, which is different from the first light function,
wherein each light source (11, 12, 13, 14) of the first light source group (10) couples light into a first type of optics element (111, 112, 113, 114) associated with the respective light source (11, 12, 13, 14),
wherein each light source (21) of the second light source group (20) couples light into a second type of optics element (121) associated with the respective light source (21),
wherein the first type of optics element (111, 112, 113, 114) produces a different optical illumination than the second type of optics element (121),
wherein a secondary optics comprising a diffusing optics (50) is arranged downstream of the first and second types of optics elements (111, 112, 113, 114, 121), through which secondary optics (50) the light exiting from the first and second types of optics elements (111, 112, 113, 114, 121) passes and is irradiated into a region in front of the lighting unit (1),
wherein the first and second light source groups (10, 20) are separately controllable,
wherein the first light source group (10) is configured to generate a flashing light function, and the second light source group (20) is configured to generate a daytime running light function, a position light function, or a combined daytime running light-position light function,
wherein at least one of the first type of optics element (111, 112, 113, 114) of the first light source group (10), in terms of a horizontal and/or vertical irradiation behaviour in a region of a casing of the at least one of the first type of optics element, is formed to produce a wide and crisscross optical illumination in a vertical direction or a horizontal direction,
wherein at least one of the second type of optics element (121) of the second light source group (20), in terms of a horizontal irradiation behaviour in a region of a casing of the at least one of the second type of optics element, is formed to produce a crisscross optical illumination in the horizontal direction,
wherein the first and second types of optics elements (111, 112, 113, 114, 121) associated with the light sources (11, 12, 13, 14, 21) are formed in a common optical component (200),
wherein adjacent optics elements of the first and second types of optics elements (111, 112, 113, 114, 121) transition into one another in transition regions (201, 202) to provide a light mixing area for the adjacent optics elements, and
wherein light from the optics elements of the first and second types of optics elements (111, 112, 113, 114, 121) enters adjacent optics elements of the first and second types of optics elements (111, 112, 113, 114, 121) through the transition regions and exits from a light exit area of the adjacent optics elements.

2. The lighting unit of claim 1, wherein the individual light sources (11, 12, 13, 14, 21) within the first or second light source group (10, 20) are separately controllable from one another.

3. The lighting unit of claim 1, wherein the first and second types of optics elements (111, 112, 113, 114, 121) are formed as TIR lenses.

4. The lighting unit of claim 1, wherein the first and second types of optics elements (111, 112, 113, 114, 121) associated with the light sources (11, 12, 13, 14, 21) are formed as light-collecting optics.

5. The lighting unit of claim 1, wherein the at least one light source (11, 12, 13, 14) of the first light source group (10) and the at least one light source (21) of the second light source group (20) are arranged on a common support (30).

6. The lighting unit of claim 5, wherein the at least one light source (11, 12, 13, 14) of the first light source group (10) and the at least one light source (21) of the second light source group (20) are arranged on a flat area of the common support (30).

7. The lighting unit of claim 1, wherein the first light source group (10) comprises two or more light sources (11, 12, 13, 14).

8. The lighting unit of claim 7, wherein the first light source group (10) comprises exactly four light sources (11, 12, 13, 14).

9. The lighting unit of claim 1, wherein the second light source group (20) comprises exactly one light source (21).

10. The lighting unit of claim 7, wherein the light sources (11, 12, 13, 14) of the first light source group (10) are arranged around the at least one light source (21) of the second light source group (20).

11. The lighting unit of claim 10, wherein the at least one light source (21) of the second light source group (20) is arranged in a center of the two or more light sources (11, 12, 13, 14) of the first light source group (10).

12. The lighting unit of claim 8, wherein the four light sources (11, 12, 13, 14) of the first light source group (10) are arranged at the corners of a virtual rectangle or square.

13. The lighting unit of claim 1, wherein one or more of the first type of optics element (111, 112, 113, 114) of the first light source group (10) are formed to produce a wide optical illumination in the vertical or the horizontal direction in a center of the first type of optical element (111, 112, 113, 114).

14. The lighting unit of claim 7, wherein two or more of the first type of optics element (111, 112, 113, 114) of the first light source group (10) are formed identically in terms of their irradiation behavior.

15. The lighting unit of claim 1, wherein one or more of the second type of optics element (121) of the second light source group (20) are formed to produce a wide optical illumination in the horizontal direction in a center of the second type of optics element (121).

16. The lighting unit of claim 1, wherein one or more of the second type of optics element (121) of the second light source group (20) are formed to produce parallel light beams in the vertical direction.

17. The lighting unit of claim 1, wherein the light sources (11, 12, 13, 14, 21) are LED light sources, wherein each LED light source (11, 12, 13, 14, 21) comprises at least one light-emitting diode.

18. The lighting unit of claim 17, wherein each LED light source (11, 12, 13, 14, 21) is separately controllable and separately dimmable.

19. A vehicle headlight comprising one or more lighting units according to claim 1.

20. The vehicle headlight of claim 19, wherein the one or more lighting units comprises four lighting units.

21. The vehicle headlight of claim 20, wherein the four lighting units (1) are arranged at the corners of a virtual rectangle or square.

22. The vehicle headlight of claim 19, wherein all of the lighting units (1) have a substantially identical structure.

23. The lighting unit of claim 18, wherein each light-emitting diode of an LED light source is separately controllable and separately dimmable.

* * * * *